(12) United States Patent
Gorbaty (10) Patent No.: US 9,146,913 B2
(45) Date of Patent: Sep. 29, 2015

(54) SPECIFICATIONS AUTOMATION SYSTEM AND METHOD

(75) Inventor: Leon Gorbaty, Richboro, PA (US)

(73) Assignee: Bentley Systems, Incorporated, Exton, PA (US)

( * ) Notice: Subject to any disclaimer, the term of this patent is extended or adjusted under 35 U.S.C. 154(b) by 264 days.

(21) Appl. No.: 13/065,721

(22) Filed: Mar. 29, 2011

(65) Prior Publication Data

US 2011/0296288 A1  Dec. 1, 2011

Related U.S. Application Data

(60) Provisional application No. 61/341,360, filed on Mar. 29, 2010.

(51) Int. Cl.
*G06F 17/24* (2006.01)
*G06F 17/22* (2006.01)
*G06Q 10/06* (2012.01)
*G06F 17/25* (2006.01)

(52) U.S. Cl.
CPC ............ *G06F 17/24* (2013.01); *G06F 17/2211* (2013.01); *G06Q 10/06* (2013.01)

(58) Field of Classification Search
CPC ....................................... G06F 17/30
USPC ....................................... 715/205
See application file for complete search history.

(56) References Cited

U.S. PATENT DOCUMENTS

| | | | |
|---|---|---|---|
| 5,596,350 A | 1/1997 | Capps et al. | |
| 5,781,905 A * | 7/1998 | Awane et al. | ........................... 1/1 |
| 6,405,211 B1 | 6/2002 | Sokol et al. | |
| 6,546,397 B1 | 4/2003 | Rempell | |
| 6,560,620 B1 * | 5/2003 | Ching | ........................... 715/229 |
| 6,874,121 B1 | 3/2005 | Mayer | |
| 6,904,562 B1 | 6/2005 | Hind et al. | |
| 6,976,213 B1 | 12/2005 | Letourneau et al. | |
| 7,039,859 B1 | 5/2006 | Sundaresan | |
| 7,594,168 B2 | 9/2009 | Rempell | |
| 7,613,996 B2 * | 11/2009 | Dallett et al. | ................... 715/223 |
| 7,636,671 B2 * | 12/2009 | Caveny et al. | ............... 705/7.11 |
| 7,756,819 B2 | 7/2010 | Jang et al. | |
| 7,890,957 B2 * | 2/2011 | Campbell | ..................... 719/313 |
| 7,945,589 B1 * | 5/2011 | Weiss et al. | ................... 707/795 |

(Continued)

OTHER PUBLICATIONS

Wilson Cooke website, Spec Builder—Streamlining Project Specifications, "Spec Construction Tool | Specification Software—Spec Builder" 2 pages, accessed online at <http://www.specificationbuilder.co.uk/> on May 27, 2014.

(Continued)

*Primary Examiner* — James J Debrow
(74) *Attorney, Agent, or Firm* — Cesari and McKenna, LLP (57) ABSTRACT

A method of leveraging computer technology to guide the user to create, display, and edit architectural and engineering information in ways specific to the architect's or engineer's needs in specification development is provided. This is provided in software that allows the automatic creation and management of architectural and/or engineering workflows, including but not limited to: procurement, quality assurance, and design, driven by engineering specifications and requirements contained therein and therewith. For each specification paragraph, in addition to the main textual component, appropriate attributes and/or elements are created and defined by a schema to support multitasking and the storing of related information for related purposes.

15 Claims, 12 Drawing Sheets

(56) References Cited

U.S. PATENT DOCUMENTS

| | | |
|---|---|---|
| 7,954,048 B2 | 5/2011 | Gauthier et al. |
| 8,122,428 B2 | 2/2012 | Dharmagadda |
| 8,321,241 B1 | 11/2012 | Mansour et al. |
| 8,849,873 B2 | 9/2014 | Gorbaty |
| 2002/0065848 A1 | 5/2002 | Walker et al. |
| 2002/0087551 A1 | 7/2002 | Hickey et al. |
| 2002/0089169 A1 | 7/2002 | Johnson et al. |
| 2002/0128994 A1 | 9/2002 | Sadhasivan et al. |
| 2003/0041077 A1 | 2/2003 | Davis et al. |
| 2003/0074419 A1 | 4/2003 | VanderDrift |
| 2004/0024662 A1 | 2/2004 | Gray et al. |
| 2004/0148307 A1 | 7/2004 | Rempell |
| 2004/0220815 A1 | 11/2004 | Belanger et al. |
| 2004/0268304 A1 | 12/2004 | Kuo et al. |
| 2005/0034056 A1* | 2/2005 | Rubin et al. ................ 715/500 |
| 2005/0065951 A1* | 3/2005 | Liston et al. ................ 707/101 |
| 2005/0097462 A1 | 5/2005 | Lumera et al. |
| 2005/0131714 A1 | 6/2005 | Braunstein et al. |
| 2005/0204347 A1* | 9/2005 | Jurkiewicz et al. .......... 717/137 |
| 2005/0260974 A1 | 11/2005 | Lee et al. |
| 2005/0262130 A1* | 11/2005 | Mohan .......................... 707/102 |
| 2005/0278698 A1* | 12/2005 | Verco ............................ 717/116 |
| 2006/0004738 A1 | 1/2006 | Blackwell et al. |
| 2006/0069986 A1* | 3/2006 | Sandoval ..................... 715/517 |
| 2006/0117294 A1 | 6/2006 | Vogler |
| 2006/0123337 A1 | 6/2006 | Koinuma |
| 2006/0149770 A1 | 7/2006 | Jang et al. |
| 2006/0155782 A1 | 7/2006 | Berstis et al. |
| 2006/0206512 A1 | 9/2006 | Hanrahan et al. |
| 2006/0206523 A1 | 9/2006 | Gaurav et al. |
| 2006/0253490 A1 | 11/2006 | Krishna et al. |
| 2007/0035403 A1 | 2/2007 | Krishna et al. |
| 2007/0067336 A1 | 3/2007 | Horany |
| 2007/0079236 A1 | 4/2007 | Schrier et al. |
| 2007/0186157 A1 | 8/2007 | Walker et al. |
| 2007/0208998 A1* | 9/2007 | Cicerone ...................... 715/531 |
| 2008/0005138 A1 | 1/2008 | Gauthier et al. |
| 2008/0046254 A1 | 2/2008 | Nuno et al. |
| 2008/0065445 A1* | 3/2008 | Livesay et al. ................... 705/7 |
| 2008/0065616 A1* | 3/2008 | Brown ............................... 707/4 |
| 2008/0189313 A1* | 8/2008 | Heinkel et al. ................ 707/102 |
| 2008/0215957 A1 | 9/2008 | Rapp et al. |
| 2008/0228671 A1 | 9/2008 | Nagaraj |
| 2008/0282148 A1 | 11/2008 | Xu |
| 2009/0007058 A1 | 1/2009 | Dharmagadda |
| 2009/0043824 A1 | 2/2009 | Claghorn |
| 2009/0125546 A1 | 5/2009 | Iborra et al. |
| 2009/0204421 A1 | 8/2009 | Guimaraes |
| 2009/0248443 A1 | 10/2009 | Kelly et al. |
| 2010/0010968 A1 | 1/2010 | Redlich et al. |
| 2010/0070930 A1 | 3/2010 | Thibault |
| 2011/0197121 A1* | 8/2011 | Kletter ......................... 715/234 |
| 2012/0191716 A1* | 7/2012 | Omoigui ....................... 707/740 |
| 2013/0047090 A1* | 2/2013 | Bhandarkar et al. .......... 715/741 |

OTHER PUBLICATIONS

Wilson Cooke website, Spec Builder—Streamlining Project Specifications, "About Spec Builder—The Spec Construction Tool", 3 pages, accessed online at <http://www.specificationbuilder.co.uk/specbuilder.php> on May 27, 2014.

* cited by examiner

| | | Vendor A | Vendor D | Vendor C |
|---|---|---|---|---|
| VENDOR NAME | | | | |
| CONTACT NAME | | | | |
| CONTACT PHONE NUMBER | | | | |
| CONTACT EMAIL ADDRESS | | | | |
| QUOTATION NUMBER | | GM-0013 | 0208265 | F08-109-H |
| QUOTATION DATE | | 11-Jul-08 | 28-Jul-08 | 11-Jul-08 |
| QUOTATION VALIDITY | | (Re-validate after FEL3) | (Re-validate after FEL3) | (Re-validate after FEL3) |
| COMPRESSION/CONDENSING PACKAGE | | $ 3,250,000.00 | $ 3,114,438.00 | $ 2,723,570.00 |
| PROCESS EVAPORATOR (CHILLER) PACKAGE | | Included | $ 720,244.00 | Included |
| | | $ - | $ - | $ - |
| | | $ - | $ - | $ - |
| | | $ - | $ - | $ - |
| | | $ - | $ - | $ - |
| | | $ - | $ - | $ - |
| TOTAL PRICE: WITHOUT ADDERS | REQUIRED | $ 3,250,000.00 | $ 3,834,682.00 | $ 2,723,570.00 |
| PRICE ADDERS: (See Adders Page for Details) | OPTIONAL | | | |
| ☐ Adders to comply with Project Specification(s) | | $ 278,100.00 | $ 368,429.00 | $ 312,250.00 |
| ☐ | | $ - | $ - | $ - |
| ☐ | | $ - | $ - | $ - |
| ☐ | | $ - | $ - | $ - |
| ☐ | | $ - | $ - | $ - |
| ☐ | | $ - | $ - | $ - |
| TOTAL PRICE: WITH SELECTED ADDERS | REQUIRED | $ 3,528,100.00 | $ 4,203,111.00 | $ 3,035,820.00 |

Bid Tabulation

Library Matrix

SPECIFICATIONS AUTOMATION SYSTEM AND METHOD

CROSS REFERENCE TO RELATED APPLICATION

This application claims the benefit of U.S. provisional application No. 61/341,360 filed on Mar. 29, 2010, which is incorporated herein by reference as if fully set forth.

BACKGROUND

Technical specifications or engineering specifications used in various industries are static documents, typically produced using a word processor. These documents contain numerous references to codes, standards and other specifications. They also contain references to other kinds of documents that are intimately related, such as equipment datasheets, inspection and test requirements, bills of material, and other engineering, procurement, and project management documents. In many cases the main engineering specifications are the governing documents, while the information on other closely related specifications and other intimately related documents becomes out-of-spec because they are treated as separate documents.

It would be desirable if the user experience of individuals who write, read, and/or act on technical specifications was both more powerful for managing engineering information and engineering workflows, and at the same time more simplified in editing from typical systems (e.g. word processing) that are in use today.

SUMMARY

The invention relates to a method of leveraging computer technology to guide the user to create, display, and edit architectural and engineering information in ways specific to the architect's or engineer's needs in specification development.

The invention also relates to the automatic creation and management of architectural and/or engineering workflows, including but not limited to: procurement, quality assurance, and design, driven by engineering specifications and requirements contained therein and therewith.

Additionally, the invention relates to business, design, and specification development methods that enhance the style and usefulness of engineering and architectural specifications.

Furthermore, this invention relates to the design and development of computer software and user interface, and configuration files that enable the application of said methods.

For the above cited reasons it is an object of the invention to provide both a datamodel and computer software to enable engineers and other professionals and responsibilities to "multitask", that is, create several documents for various purposes and workflows and business requirements from a single editing session.

For the datamodel, for each specification paragraph, in addition to the main textual component, the appropriate attributes and/or elements are created and defined by schema to support said multitasking and the storing of related information for related purposes.

For the computer program and user interface, the ability for the user to write the main textual components of the specification while having simultaneously in view the content of the various metadata, as necessary, and being able to edit all at the same time.

Applicable to both datamodel and user interface, is the automatic linking and electronic management of the relationships of each paragraph and its metadata, as well as the ability to publish the main spec and its related sub-specifications and/or documents automatically.

BRIEF DESCRIPTION OF THE DRAWINGS

FIG. 3 shows a four-way overlay driven by specification paragraph number.

FIG. 4 shows an in-line difference based on "multi-purpose" specification selection (a Corporate Business Unit in this case), where all of the specifications and/or requirements that are not applicable to the business unit appears as stricken-out in different color.

FIG. 5 show a side-by-side comparison of a multi-purpose specification, showing which specifications and/or requirements are applicable to which corporate business unit, and how they compare to each other.

DETAILED DESCRIPTION

Figure 1:
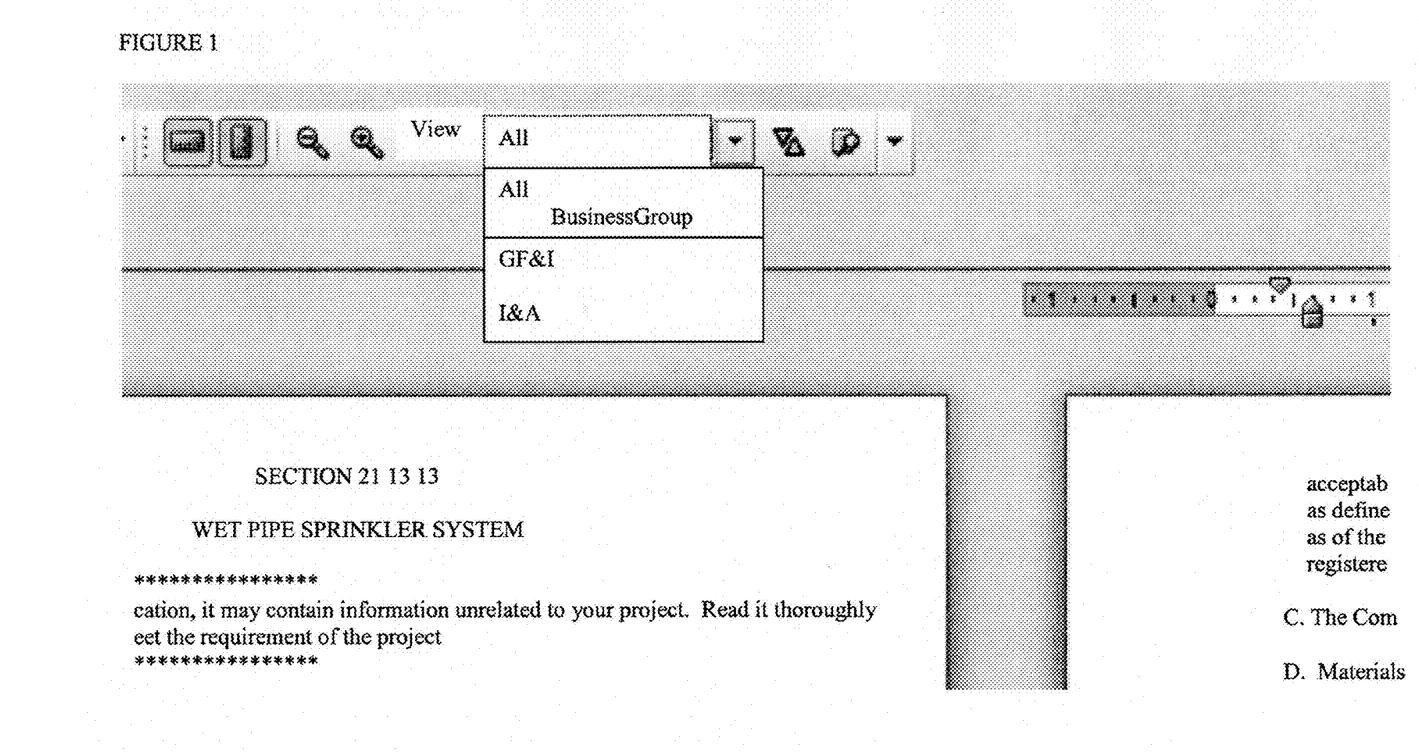
FIG. 1 shows an application window with "View" Drop down on the toolbar shows there are now 2 Business Group specific views of the document available. Views are dynamic and automatically appear based on the XML tags that have been applied to the document, and demonstrate an example of MULTI-PURPOSE specifications.

MULTI-PURPOSE SPECIFICATIONS. The system automatically detects user context for current specification and sets-up context specific views. Choices for context can be system defined, external configuration file defined, or ad-hoc defined by the user at time of use, or any combination thereof.

Figure 2:
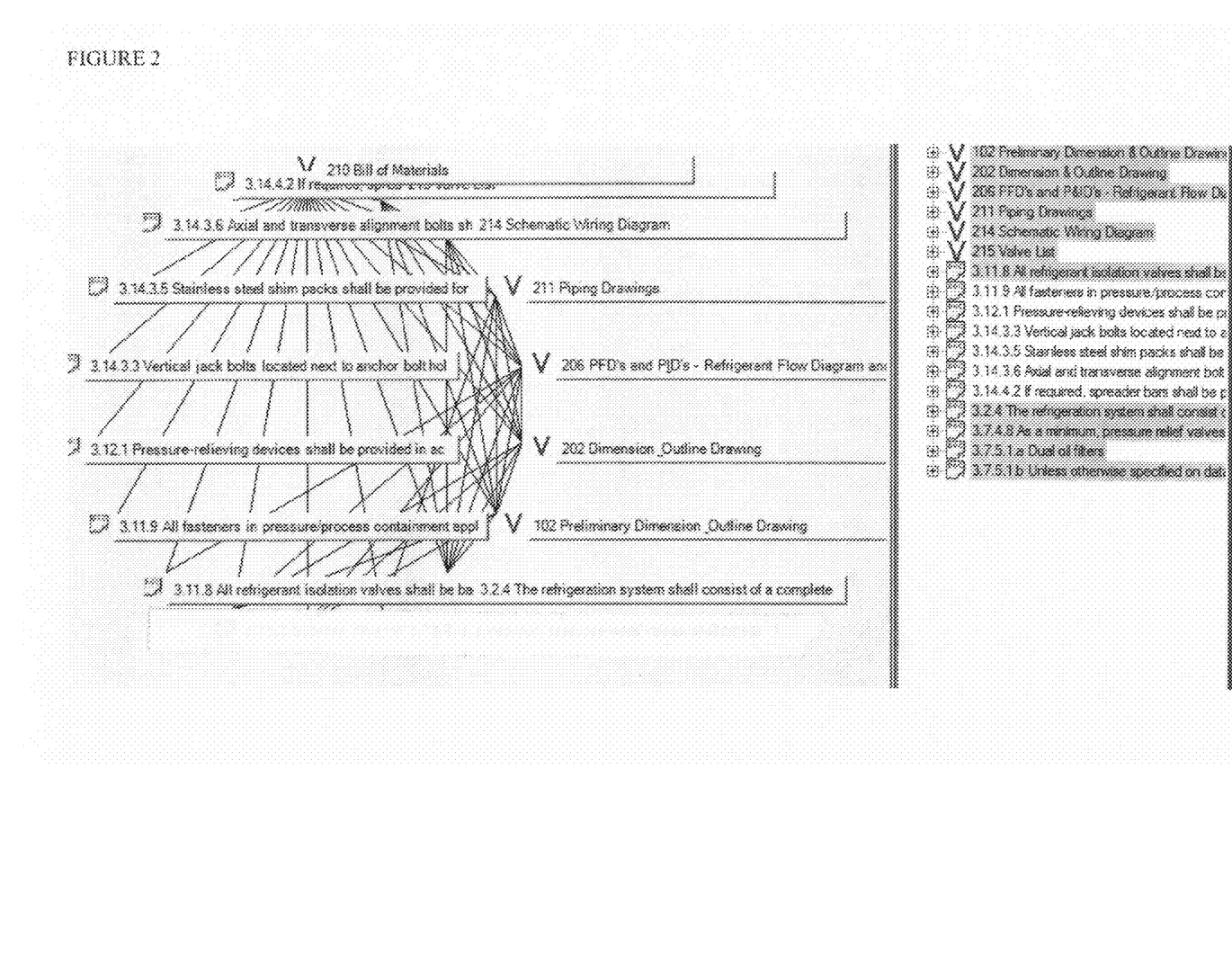
FIG. 2 shows Linkage of related objects.

LINKAGE OF RELATED OBJECTS. The system allows the user to link spec objects to other spec objects and/or other contexts and/or objects.

Figure 3:
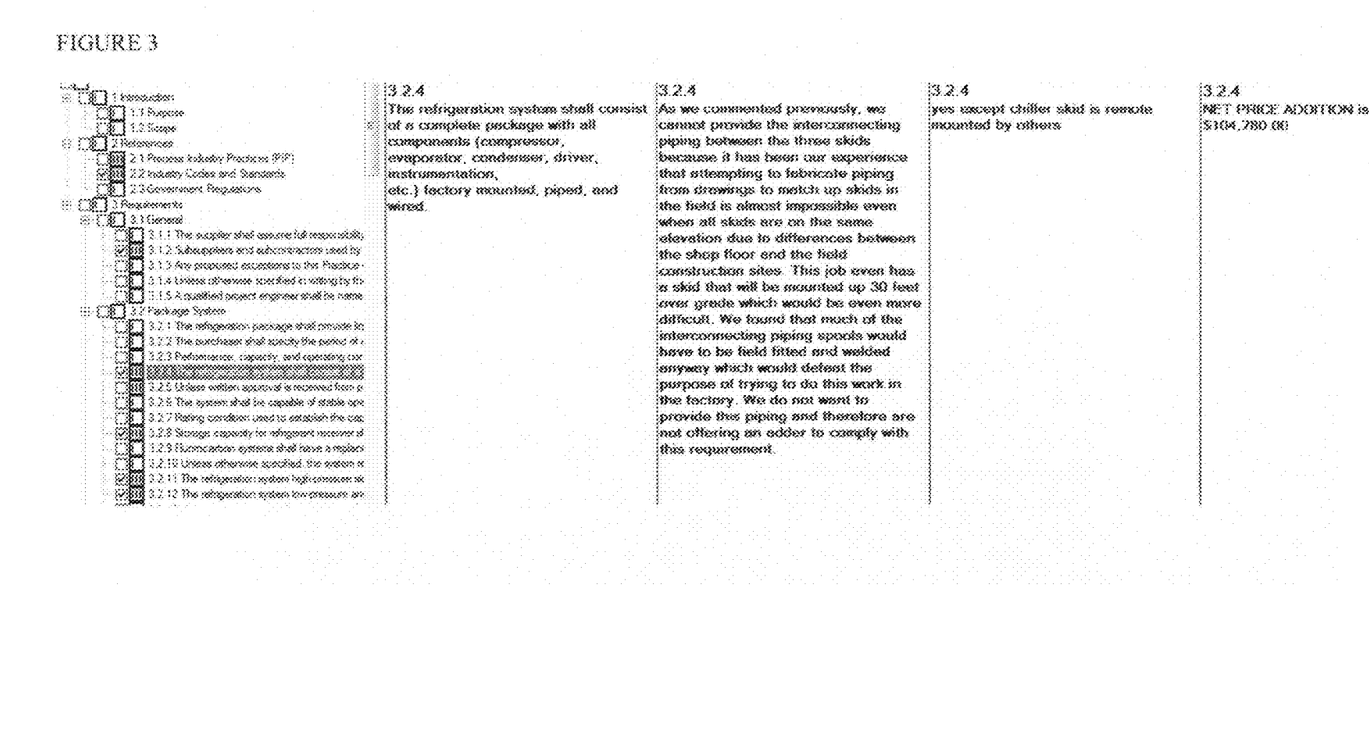
FIGS. 3, 4, and 5 show various modes of side-by-side and in-line specification comparisons.
Figure 4:
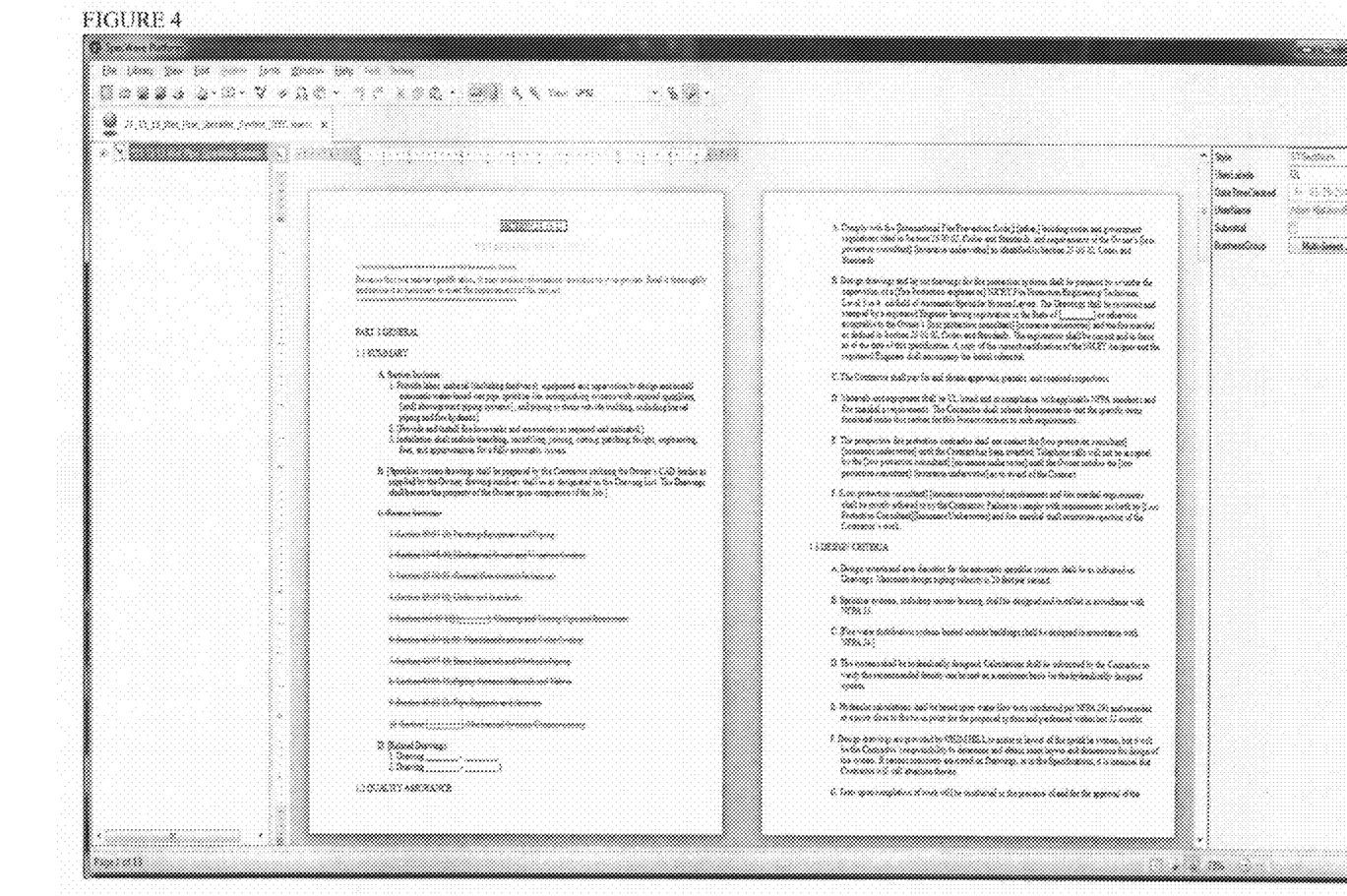
Figure 5:
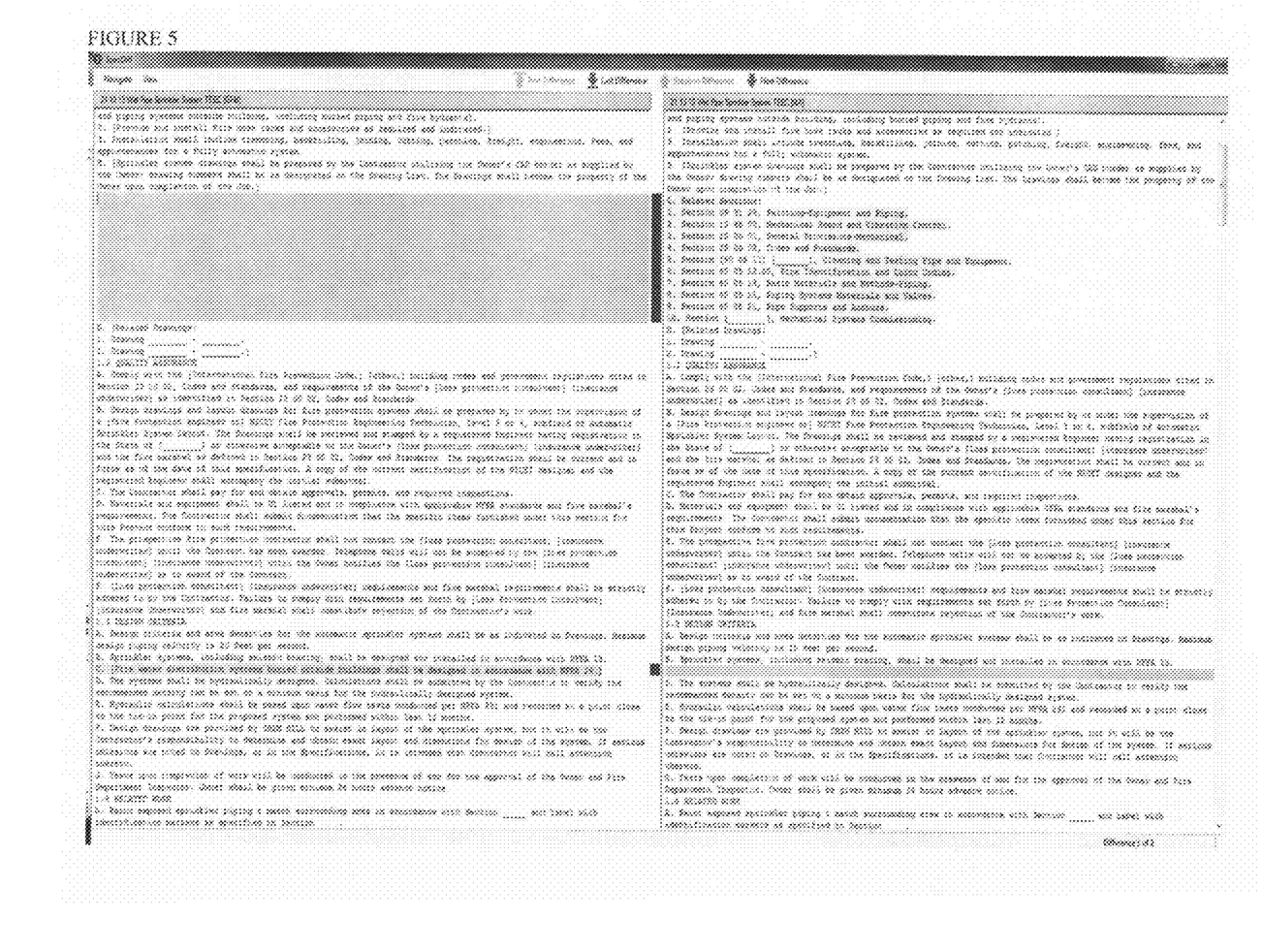

COMPARISONS. As a matter of prior art, software developers have long utilized a system called "differencing", or "diff", for comparing text (typically source-code files) documents. Differencing can be in-line or side-by-side, and is typically colorized to visually compare and contrast similar documents. This invention claims the method of displaying diff specific to specifications and specification workflows, such as "spec overlays", "exception specs", "comments, exceptions and clarifications to specifications", and "multi-purpose" specifications. In the prior art of text-based diff, the differencing logic is driven "the line of text". This invention claims the innovation of driving diff based on the specification datamodel and XML tagging, and being able to compare spec information based on paragraph and/or section number, textual content, and/or workflow metadata such as submittals, QA requirement, and Data specifications. Furthermore, this invention incorporates the specification-specific differencing of two OR MORE views simultaneously.

Figure 6:
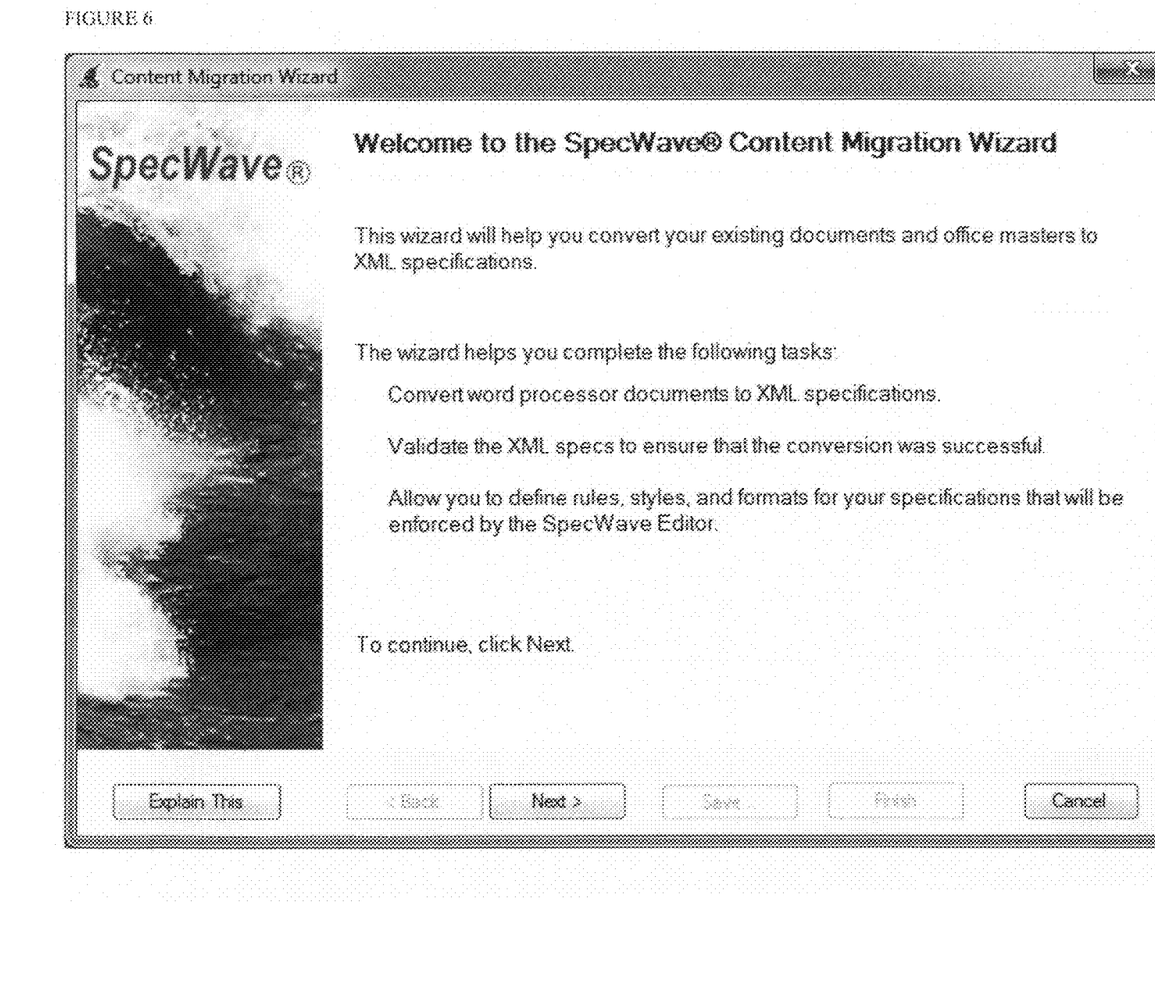
FIG. 6 depicts a Persistable workflow wizard.

PERSISTABLE WORKFLOW WIZARDS. Package an entire workflow so that not only is it resume-able, it is also portable (you can post it, email, etc., and someone else can continue the workflow, then pass it on, or return, and so on). We think that this will pose a huge ease-of-use feature to minimize software training for specialists and suppliers. For example, consider the following workflow:

Spec master begins migration of disparate word files by taking steps in the wizard such as
  Paragraph structure definition
  Initial conversion
    Structure and Formatting observation, correction, massaging, etc.
Spec Master saves the workflow and emails it to a Fire Protection Expert to review the documents and see if they can be combined.
Fire Protection Expert simply opens the file he received, and it immediately loads into a workflow wizard that is poised to walk him through the file review and combination process.
  Fire protection expert simply has to follow the instructions in each step, without having to neither read anything nor learn anything new . . . nor fumble around with a new set of application menus with which he is not familiar.
  The steps will carefully walk the Fire Protection Expert through the tagging process so that his thoughts and combination logic are captured on the content. The application will be completely responsible for data integrity, minimizing the possibility of user error. The information will be collected in some simple way, e.g. "Please provide description for documents on the left" (he inputs "Single Story"); "Please provide description for documents on the right" (he inputs Multi-Story), and so on. We will create the custom tags automatically from the descriptions.
Fire Protection Expert saves his workflow and emails it back to the Spec Master.
The Spec Master can go <Back> and <Next>, scrolling through the expert's workflow, to see exactly what he did. Make corrections, optimizations.
Then publish and end workflow . . . .

In this way we are creating architecture for "person responsible" to set up, drive, and make it really easy for various dependencies to provide their input (another example, supplier comments and/or acceptance of the documents). We also have a strategy to make workflows configurable by the Spec Master to designate the steps and those responsible for the steps (e.g. only Fire Protection Expert can touch content tagged as "Fire Protection", and the pump guy can only touch the hydraulics, and the metallurgist can only touch paint and welding, and so on).

Figure 7:
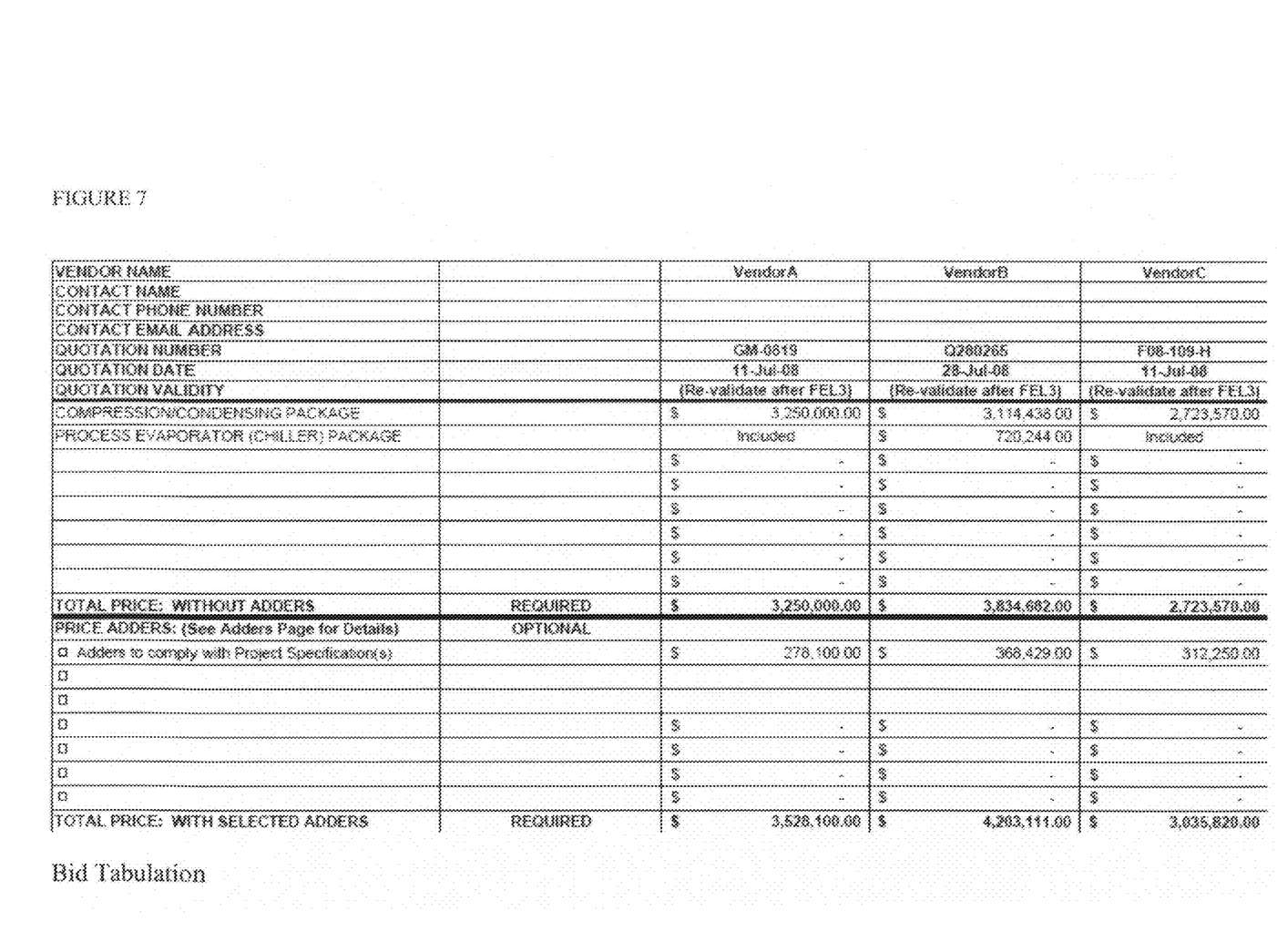
FIG. 7 depicts a "bid tabulation".

DESIGN AND/OR BID TABULATION. This invention is built on the COMPARISONS and/or PERSISTABLE WORKFLOW WIZARDS to automate side-by-side (AKA 'apples-to-apples') comparisons of design details and/or requisitions and/or proposals.

Figure 8:
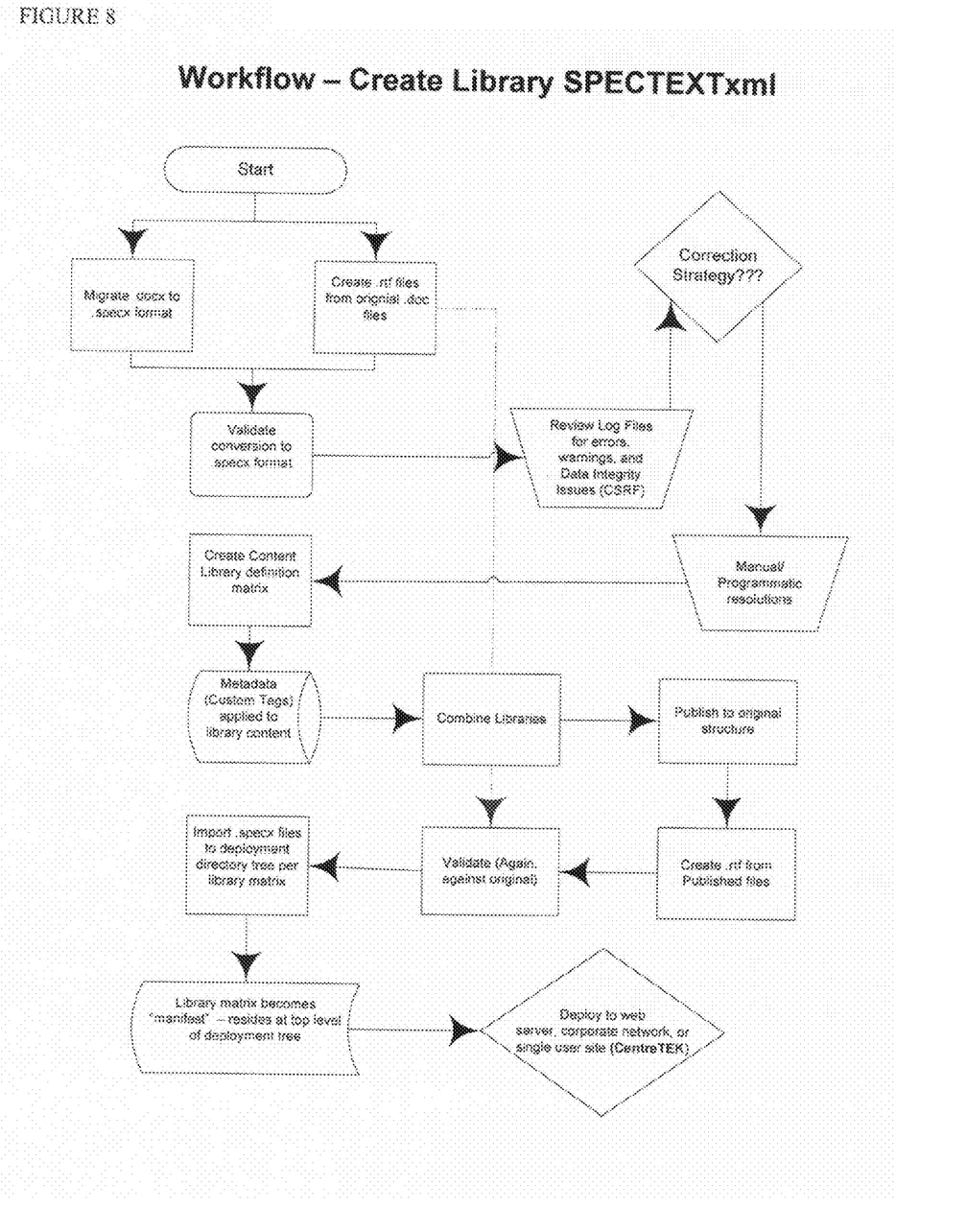
FIG. 8 depicts the specification migration process.

MIGRATION (CONVERSION AND VALIDATION). Migration is the process of reading (AKA "parsing") existing specs, in some cases well-formatted, in some cases poorly formatted, "scrubbing", "normalizing", and converting to well-formed "specx" XML.

Figure 9:
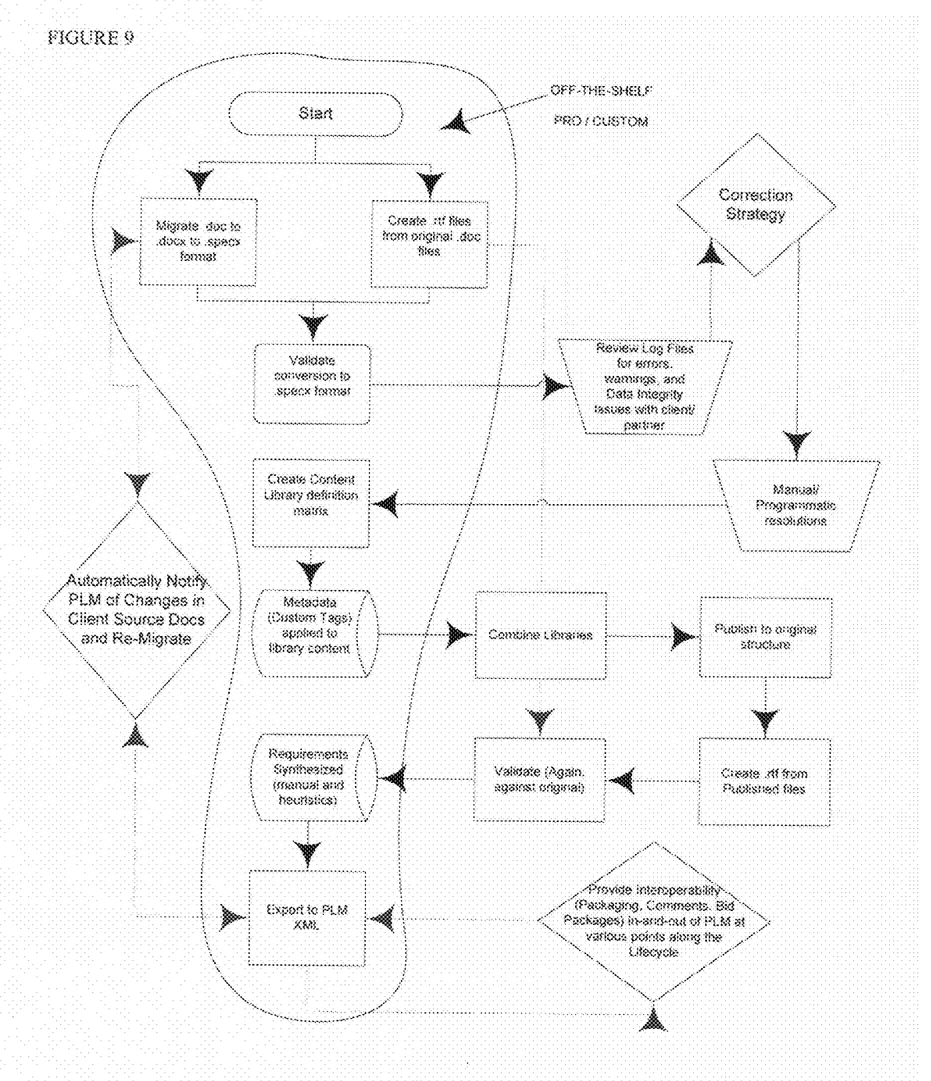
FIG. 9 depicts migration and lifecycle specification management for and/or with a PLM (Product and/or Plant Lifecycle Management) system.

Migration utilities are intended primarily for Administrators, Spec Masters, Department Leads, etc., and are generally necessary only for one-time use in preparing legacy specs for the new system. Day-to-day users may, in some cases, also use the migration utilities for local migration(s) and/or follow-up processing of additional content. Migration, conversion, and/or validation steps may be menu and/or ribbon driven from the main user interface or Persistable Workflow Wizard driven.

Figure 10:
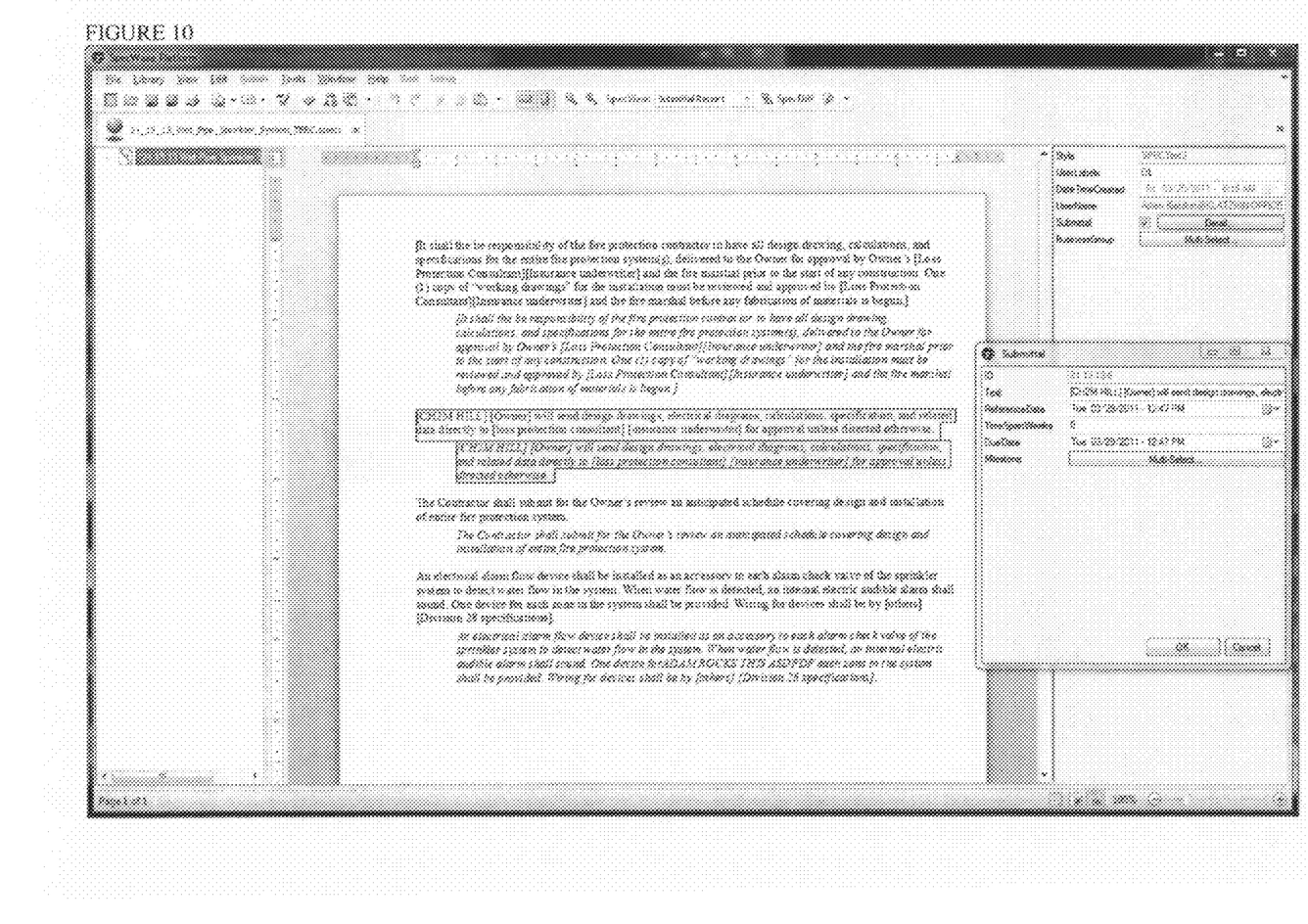
FIG. 10 depicts the specification editor.

EDITOR. Specification Editor optimized for Architects and Engineers. Editing optimized for the professional spec writer/spec master. Editing simplified for architects, engineers, and project managers. Editing enforces "whole paragraphs" and/or "meaningful fragments" as defined in XML model. Editor provides feedback with color and border around whole paragraph, current fragment, and workflow-specific metadata as applicable. Editor does allow user to violate corporate and/or document styles nor formats, nor the underlying XML schema.

CENTRALIZED REFERENCES SECTIONS. This is implemented as "Proxy Specs", i.e., documents that contain references to external standards (external to a company, external to the library, external to any context of collection) and the rest of the documents in 'the current set' point to. Specification Automation System and Method provides specific support and 'productization' of this concept and functionality.

Figure 11:
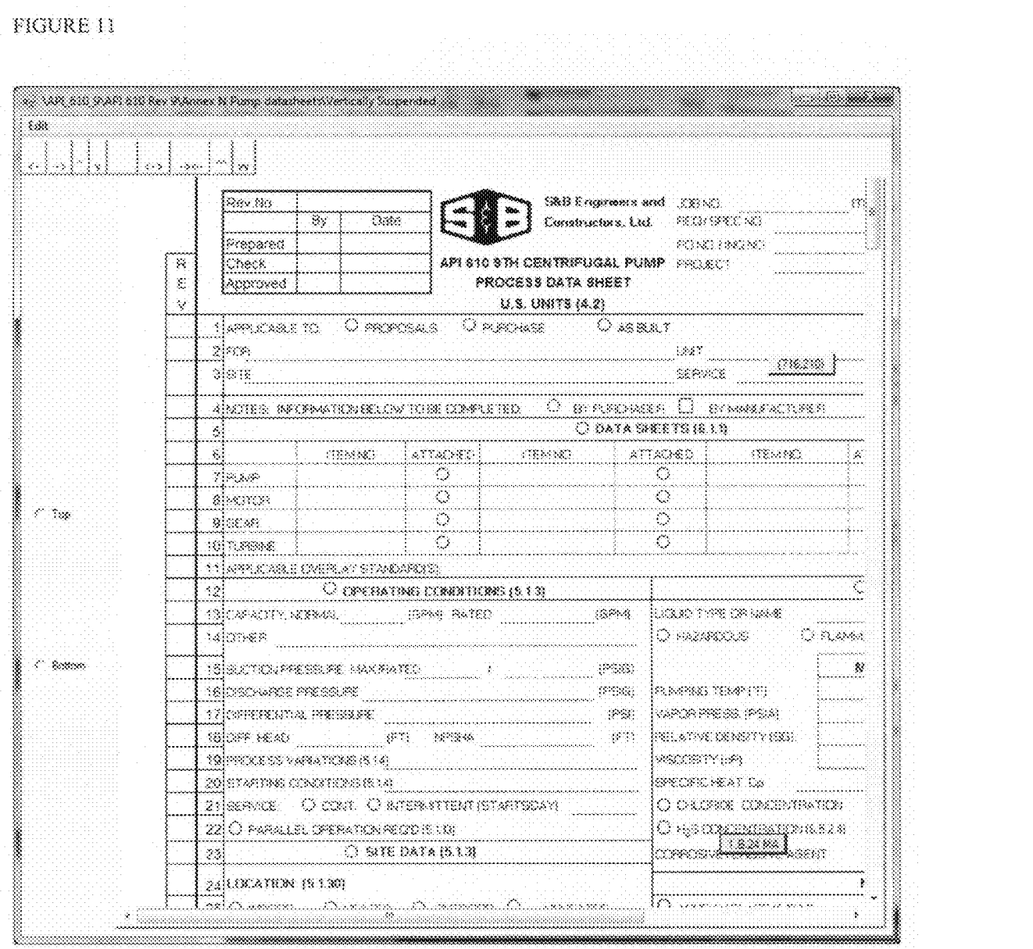
FIG. 11 depicts Datasheet Automation.

DATASHEET AUTOMATION. Specification Automation System and Method provide support for linking specification objects with "datasheets", AKA "spec-sheets". This invention provides a user who is working on or with datasheets to conveniently reference the pertinent narrative specification object(s) by tooltip, hyperlink, button, and/or similar automated manner.

Figure 12:
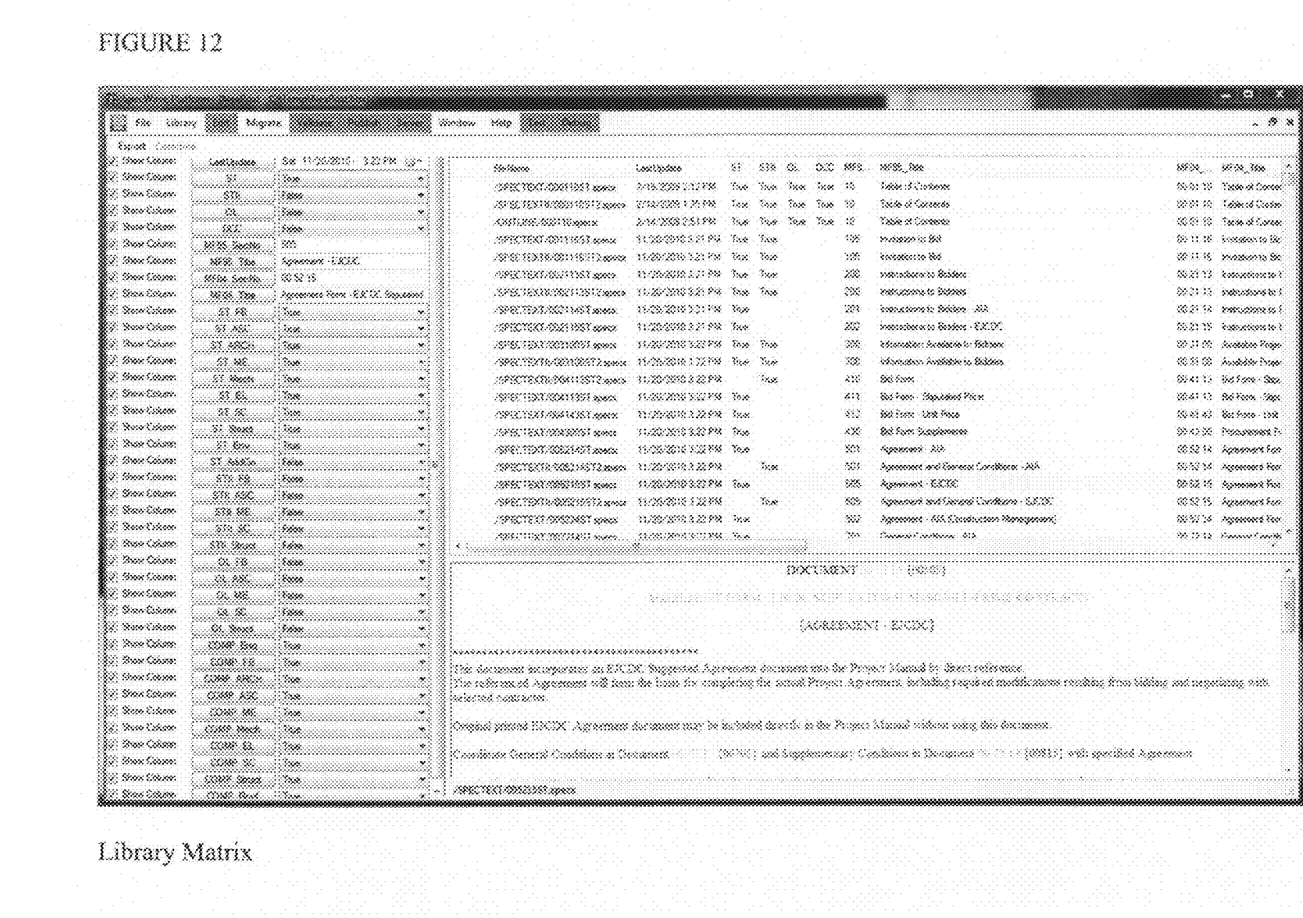
FIG. 12 depicts a Library Matrix

LIBRARY MATRIX. Specification Automation System and Method creates a dynamic table of contents of a specification library. The tabular definition may come from an external system such as a spreadsheet or a traditional document table of contents, or created from within the software. Library Matrix allows user to show columns selectively, see a preview of the selected document, single or multi-select documents, and/or import and/or export and/or create specification libraries.

The system is implemented utilizing a PC or other computer processor programmed with the specific method according to the invention.

DESCRIPTION OF ADDITIONAL EMBODIMENTS

A method for Persistable workflow wizards, Leveraging a typical "wizard" driven User Interface, said method consisting of:
  A user (say UserA) launches the "workflow wizard" and initiates a sequential industry workflow (e.g. request for comments to specification);
  UserA takes initial steps and sets-up the remaining workflow;
  UserA may or may not name the next sequential user and/or assign next user permissions and/or credentials;
  UserA names and saves the workflow session;
  The workflow is saved in a spec library file;
  UserB opens the workflow file;
  UserB permissions (if any) are checked;
  UserB continues the wizard driven workflow;
  UserB saves the workflow;
  UserA resumes the workflow;
  UserA can find out UserB changes automatically;
  Workflow can continue and/or repeat.

A method of automated design and/or bid tabulations, said method consisting of:
  Leveraging the metadata on every object (e.g. cost adders for special requirements);
  Leveraging the comparisons;

Leveraging the wizard driven workflows;

Creating an interactive system (e.g. spec master to subject matter expert; requisitioning engineer to supplier, etc.) for request for comment, impact, and/or cost;

Leveraging the reminders;

Leveraging meta-data for open items (that have not been responded to)

Create automatic tabular comparisons of relevant information.

A method of migrating specifications into xml while correcting and/or improving the content interactively with the user. Said method consisting of:

Assembling source files (in various formats);

Converting source files into XML specifications (with or without intermediate steps and files for format and conversion purposes);

Log errors, warnings, and/or messages during the conversion process;

Convert source files and final xml files each to a text and/or rich text (RTF) representation;

Compare said text and/or RTF representations [leveraging spec comparison topic of this invention] for validation;

Provide User Interface to rectify differences and/or optimize content going from source to target XML specifications.

A method of editing specifications in a manner that separates content from presentation and enforces well formatted, well structured, specification documents. Said method consisting of An editor that enforces XML specifications per schema;

Visualization aids (e.g. color, border, and/or other) that allow the user to focus on and to understand specification structure;

Visualization and User Interface for metadata and the ability to seed, annotate, define, and/or drive workflows directly from the editing environment.

A method for centralizing external references, AKA "Proxy Specs", said method consisting of:

Creating an XML specification dedicated to maintaining references and latest date and/or revision level for external codes, standards, and/or specifications;

Providing a convenient User Interface [leveraging the linking topic of this invention] to link to the proxy spec from other documents;

The referenced spec would show-up in the view and/or print and/or publish of the referencing spec based on the reference, without copying nor duplicating the proxy information.

A method for linking datasheets to their governing specifications. Said method consists of:

Generating datasheets based on metadata on specification objects (instead of the traditional way of datasheets being standalone documents);

Datasheets become "Spec Views" just like submittals and inspection requirements;

Datasheet views are especially configured in accordance with the appropriate industry datasheet format and/or user preference;

Datasheet automation allows persons who interact with the datasheet to be fully aware of directly and indirectly pertinent specifications and/or requirements.

A method of providing a tabular or "matrix" display of specification library contents. Said method consisting of:

Creating the "matrix" or "manifest" from a spreadsheet or table;

Displaying the matrix in a user interface that is dynamic with respect to the library contents;

Providing grouping and/or sorting mechanisms;

Providing import, export, and/or combine functionalities [combine creates multi-purpose specifications as claimed herewith and in USPTO Utility application Ser. No. 12/661,507 filed on Mar. 18, 2010]

Show preview(s) of library contents;

Allow the direct editing of document-level metadata.

What is claimed is:

1. A method of automatic discovery and differencing of multiple corporate business unit specific views based on a single multi-purpose specification loaded in a computer memory, said method comprising the steps of:

detecting user definition of specification-related metadata of the single multi-purpose specification loaded in the computer memory, the single multi-purpose specification including a plurality of paragraphs;

based on the detected specification-related metadata, automatically populating a menu with a plurality of view choices for the single multi-purpose specification, each view choice corresponding to a corporate business unit specific specification view generatable from the single multi-purpose specification, each corporate business unit specific specification view showing only paragraphs of the plurality of paragraphs of the single multi-purpose specification that are applicable to a related corporate business unit, the paragraphs of the plurality of paragraphs that are shown to differ from those shown in one or more other corporate business unit specific specification views;

for at least one corporate business unit specific specification view generated from the single multi-purpose specification, calculating a difference between the at least one corporate business unit specific specification view and another corporate business unit specific specification view;

displaying the difference in a current specification view; and collapsing or expanding the current specification view according to user view selection.

2. The method of claim 1, wherein the difference is based on metadata of the single multi-purpose specification.

3. The method of claim 1, wherein the difference is displayed in a side-by-side mode that includes two or more differencing windows.

4. The method of claim 1, wherein the difference is displayed in an in-line mode.

5. The method of claim 1, wherein the single multi-purpose specification includes a plurality of specification objects, and the method further comprises:

defining links between the specification objects.

6. The method of claim 5, further comprising:

generating corporate business unit specific specification views based on the links.

7. The method of claim 1, wherein the specification-related metadata is user-defined extensible markup language (XML) tags that have been applied to the single multi-purpose specification, and the automatically populating a menu with a plurality of view choices for the single multi-purpose specification is based on the detected XML tags.

8. A non-transitory computer readable medium storing computer software, the computer software when executed on a computer operable to:

detect specification-related metadata of a single multi-purpose specification, the single multi-purpose specification including a plurality of paragraphs;

based on the detected specification-related metadata, automatically populate a menu with a plurality of view choices for the single multi-purpose specification, each view choice corresponding to a corporate business unit specific specification view generatable from the single multi-purpose specification, each corporate business unit specific specification view showing only paragraphs of the plurality of paragraphs of the single multi-purpose specification that are applicable to a related corporate business unit, the paragraphs of the plurality of paragraphs that are shown to differ from those shown in one or more other corporate business unit specific specification views;

for at least one corporate business unit specific specification view generated from the single multi-purpose specification, calculate a difference between the at least one corporate business unit specific specification view and another corporate business unit specific specification view; and display the difference in a current specification view.

9. The non-transitory computer readable medium of claim 8, wherein the difference is based on metadata of the single multi-purpose specification.

10. The non-transitory computer readable medium of claim 8, wherein the difference is displayed in a side-by-side mode that includes two or more differencing windows.

11. The non-transitory computer readable medium of claim 8, wherein the difference is displayed in an in-line mode.

12. The non-transitory computer readable medium of claim 8, wherein the single multi-purpose specification includes a plurality of specification objects, and the computer software when executed on the computer is further operable to:

define links between the specification objects.

13. The non-transitory computer readable medium of claim 12, wherein the computer software when executed on the computer is further operable to:

generate corporate business unit specific specification views based on the links.

14. A method of automatic discovery and differencing of multiple corporate business unit specific views based on a single multi-purpose specification loaded in a computer memory, said method comprising the steps of:

detecting user definition of specification-related metadata of the single multi-purpose specification loaded in the computer memory, the single multi-purpose specification including a plurality of paragraphs;

based on the detected specification-related metadata, providing a plurality of view choices for the single multi-purpose specification, each view choice corresponding to a corporate business unit specific specification view generated from the single multi-purpose specification, each corporate business unit specific specification view showing only paragraphs of the plurality of paragraphs of the single multi-purpose specification that are applicable to a related corporate business unit, the paragraphs of the plurality of paragraphs that are shown to differs from those shown in one or more other corporate business unit specific specification views;

for at least one corporate business unit specific specification view generated from the single multi-purpose specification, calculating a difference between the at least one corporate business unit specific specification view and another corporate business unit specific specification view; and displaying the difference to a user in a current specification view.

15. The method of claim 14, wherein the specification-related metadata is user-defined extensible markup language (XML) tags that have been applied to the single multi-purpose specification, and the providing a plurality of view choices for the single multi-purpose specification is based on the detected XML tags.

* * * * *